(12) United States Patent
Chang et al.

(10) Patent No.: US 9,791,285 B2
(45) Date of Patent: Oct. 17, 2017

(54) NAVIGATION APPARATUS AND METHOD

(75) Inventors: Suk-Jin Chang, Gyeonggi-Do (KR);
Eun-Hee Jeong, Seoul (KR);
Chae-Guk Cho, Gyeonggi-Do (KR);
Su-Jin Kim, Seoul (KR); Kyoung-Hwa Kim, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 208 days.

(21) Appl. No.: 12/772,846

(22) Filed: May 3, 2010

(65) Prior Publication Data

US 2010/0217518 A1   Aug. 26, 2010

Related U.S. Application Data

(63) Continuation-in-part of application No. 12/421,885, filed on Apr. 10, 2009.

(30) Foreign Application Priority Data

Oct. 1, 2008  (KR) .......................... 10-2008-0096833

(51) Int. Cl.
G01C 21/36  (2006.01)

(52) U.S. Cl.
CPC ......... *G01C 21/36* (2013.01); *G01C 21/3688* (2013.01)

(58) Field of Classification Search
CPC ........ G01C 21/00; G01C 21/30; G01C 21/34; G01C 21/3492; G01C 21/36; G01C 21/3688; G08G 1/096827; G08G 1/096883

USPC .......................................... 701/400–541, 201
See application file for complete search history.

(56) References Cited

U.S. PATENT DOCUMENTS

| | | | |
|---|---|---|---|
| 4,814,989 A | 3/1989 | Dobereiner et al. | |
| 6,192,314 B1 * | 2/2001 | Khavakh | G01C 21/34 701/410 |
| 6,347,278 B2 | 2/2002 | Ito | |
| 6,356,836 B1 | 3/2002 | Adolph | |
| 6,411,895 B1 * | 6/2002 | Lau | G01C 21/3605 340/932.2 |
| 7,579,940 B2 * | 8/2009 | Schofield | B60C 23/00 340/425.5 |
| 7,925,435 B2 | 4/2011 | Brulle-Drews | |
| 2002/0197955 A1 * | 12/2002 | Witkowski | G07C 5/008 455/41.1 |
| 2004/0249565 A1 | 12/2004 | Park | |
| 2006/0041372 A1 * | 2/2006 | Kubota | G01C 21/3697 701/532 |

(Continued)

FOREIGN PATENT DOCUMENTS

| | | |
|---|---|---|
| JP | 9-178499 A | 7/1997 |
| JP | 2007-57375 A | 3/2007 |

(Continued)

*Primary Examiner* — Joy Chng
(74) *Attorney, Agent, or Firm* — Birch, Stewart, Kolasch & Birch, LLP

(57) ABSTRACT

A navigation configured to be installed in a motor vehicle, and a corresponding method. According to an embodiment, there is a method that includes: a) reproducing video information corresponding to a straight section included in the route information at a speed faster than a typical reproduction speed; and b) reproducing video information corresponding to a curved section included in the route information at a speed slower than the typical reproduction speed.

22 Claims, 11 Drawing Sheets

(56) References Cited

U.S. PATENT DOCUMENTS

| | | | |
|---|---|---|---|
| 2007/0150188 A1* | 6/2007 | Rosenberg | G01C 21/3647 701/431 |
| 2008/0071473 A1* | 3/2008 | Choi | G01C 21/265 701/431 |
| 2008/0229247 A1* | 9/2008 | Bamba | G06F 9/4443 715/835 |
| 2008/0262717 A1* | 10/2008 | Ettinger | G01C 21/3476 701/467 |
| 2009/0157297 A1 | 6/2009 | Hagiwara | |
| 2010/0062401 A1* | 3/2010 | Kerr | G01C 21/36 434/62 |
| 2010/0082241 A1* | 4/2010 | Trivedi | G01C 21/3679 701/532 |
| 2011/0106426 A1* | 5/2011 | Tertoolen | G01C 21/3476 701/533 |

FOREIGN PATENT DOCUMENTS

| | | |
|---|---|---|
| JP | 10-2008-0063901 A | 7/2008 |
| KR | 10-2005-0052748 A | 6/2005 |

* cited by examiner

700

| ↱ | Steve Flanders Square 10m |
|---|---|
| ↰ | City Hall 100m |
| ↱ | Chambers St 100m |

(1) Right Turn : Steve Flanders Square 10m
(2) Left Turn : City Hall 100m
(3) Right Turn : Chambers St 100m

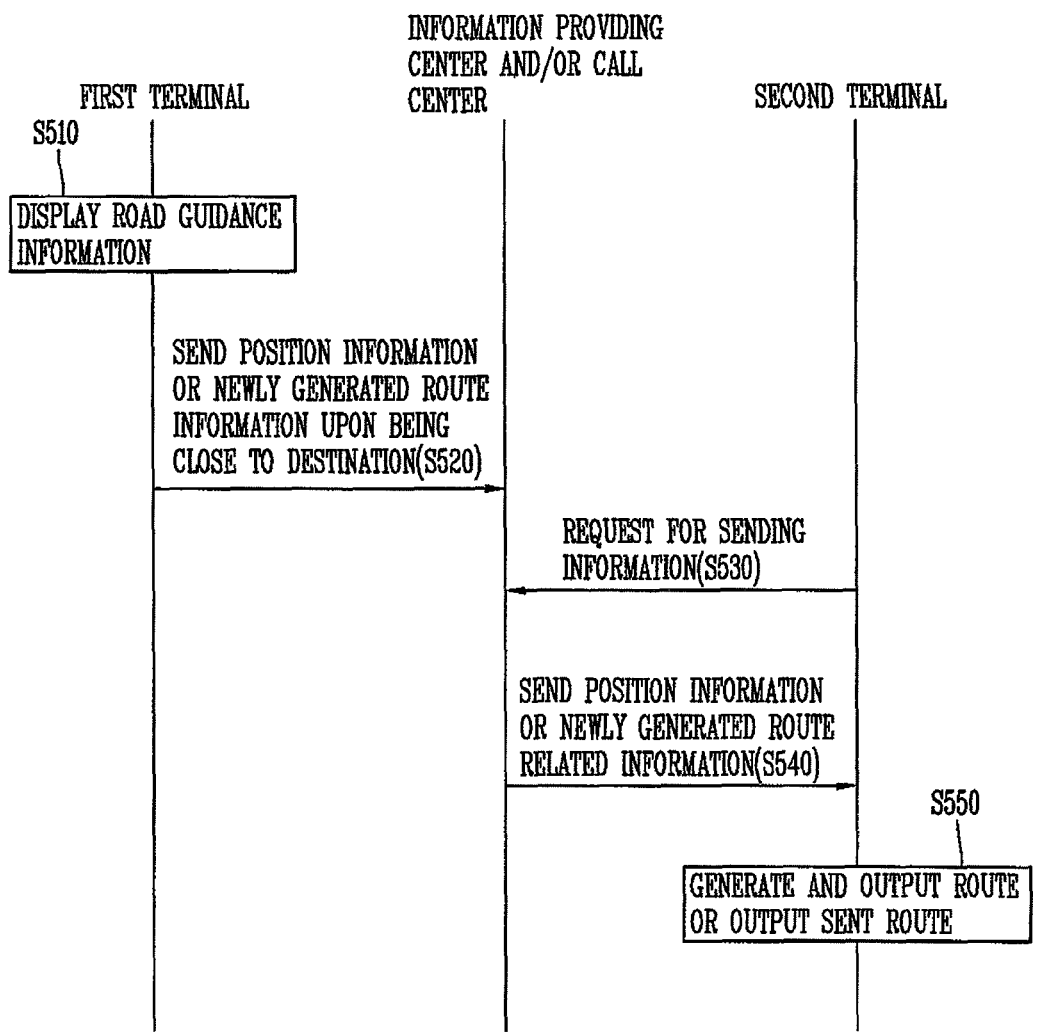

NAVIGATION APPARATUS AND METHOD

CROSS REFERENCE TO RELATED APPLICATIONS

The present application is a Continuation-in-part of co-pending application Ser. No. 12/421,885, filed on Apr. 10, 2009, which claims priority to Korean Application No. 10-2008-0096833, filed on Oct. 1, 2008, each of which are herein expressly incorporated by reference in their entirety.

BACKGROUND OF THE INVENTION

Field of the Invention

The present invention relates to a navigation apparatus and method.

Description of the Related Art

A related art mobile vehicle navigation apparatus is an apparatus which generates road guidance information based on a Global Positioning System (GPS) signal and map information, and provides the road guidance information to a user.

However, the related art mobile vehicle navigation apparatus cannot a) display road guidance information from an origination position to a first destination point; b) determine whether a current position is the first destination point; c) upon determining that the current position is not the first destination point, generate a route from the current position to the first destination point; and d) wirelessly transmit the route to a mobile communication terminal.

SUMMARY OF THE INVENTION

To achieve these and other advantages in accordance with one aspect of the present invention, as embodied and broadly described herein, there is provided a navigation method including: displaying road guidance information; determining whether an arrival point is an ultimate destination when a first position of a first terminal is near the arrival point; and generating a new route using position information based upon the result of the determination, or sending the position information to a second terminal.

In another aspect of the present invention, there is provided a navigation method including: displaying road guidance information; and generating a new route using position information or sending the position information to a second terminal in case where a first position of a first terminal is near an arrival point.

In one aspect of the present invention, there is provided a navigation apparatus including: a display configured to display road guidance information; and a controller configured to determine whether an arrival point is an ultimate destination when a first position of a first terminal is near the arrival point, and generate a new route using position information based upon the determination or send the position information to a second terminal.

In one aspect of the present invention, there is provided a navigation method performed by a navigation terminal configured to be installed in a motor vehicle. The method includes a) displaying road guidance information from an origination position to a first destination point; b) determining whether a current position is the first destination point; c) upon determining that the current position is not the first destination point, generating a route from the current position to the first destination point; and d) wirelessly transmitting the route to a mobile communication terminal.

The method may also include a) determining whether the current position is within a preset range of the first destination point; and/or b) determining a distance between the current position and the first destination point.

The method may also include a) displaying a message prompting a user to indicate whether the current position is the first destination point; and b) receiving an input from the user indicating whether the current position is the first destination point.

The method may also include a) receiving from the user a second destination point; b) generating a second route from one of the current position and the first destination point to the second destination point; and c) wirelessly transmitting the second route to the mobile communication terminal.

The second route may also include second route data in one of an image format, a turn-by-turn list format, and a text format.

The first route may include first route data in one of an image format, a turn-by-turn list format, a text format, an animation format, and a multimedia format.

The method may also include a) generating a reverse route between the first destination point and the current position; and b) wirelessly transmitting the reverse route to a second mobile communication terminal.

The method may also include a) receiving a user input identifying an alternative position; b) generating a route from the first destination point to the alternative position; and c) wirelessly transmitting the route from the first destination point to the alternative position to a second mobile communication terminal.

The method may also include automatically determining whether a current position is the first destination point upon terminating motor vehicle movement.

In alternative embodiment, there may be a device and method for displaying route information. The step of displaying may include: reproducing video information corresponding to a straight section included in the route information at a speed faster than a typical reproduction speed; and reproducing video information corresponding to a curved section included in the route information at a speed slower than the typical reproduction speed.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 10 is a flowchart showing a navigation method in accordance with a fifth embodiment of the present invention.

DETAILED DESCRIPTION OF THE INVENTION

Figure 1:
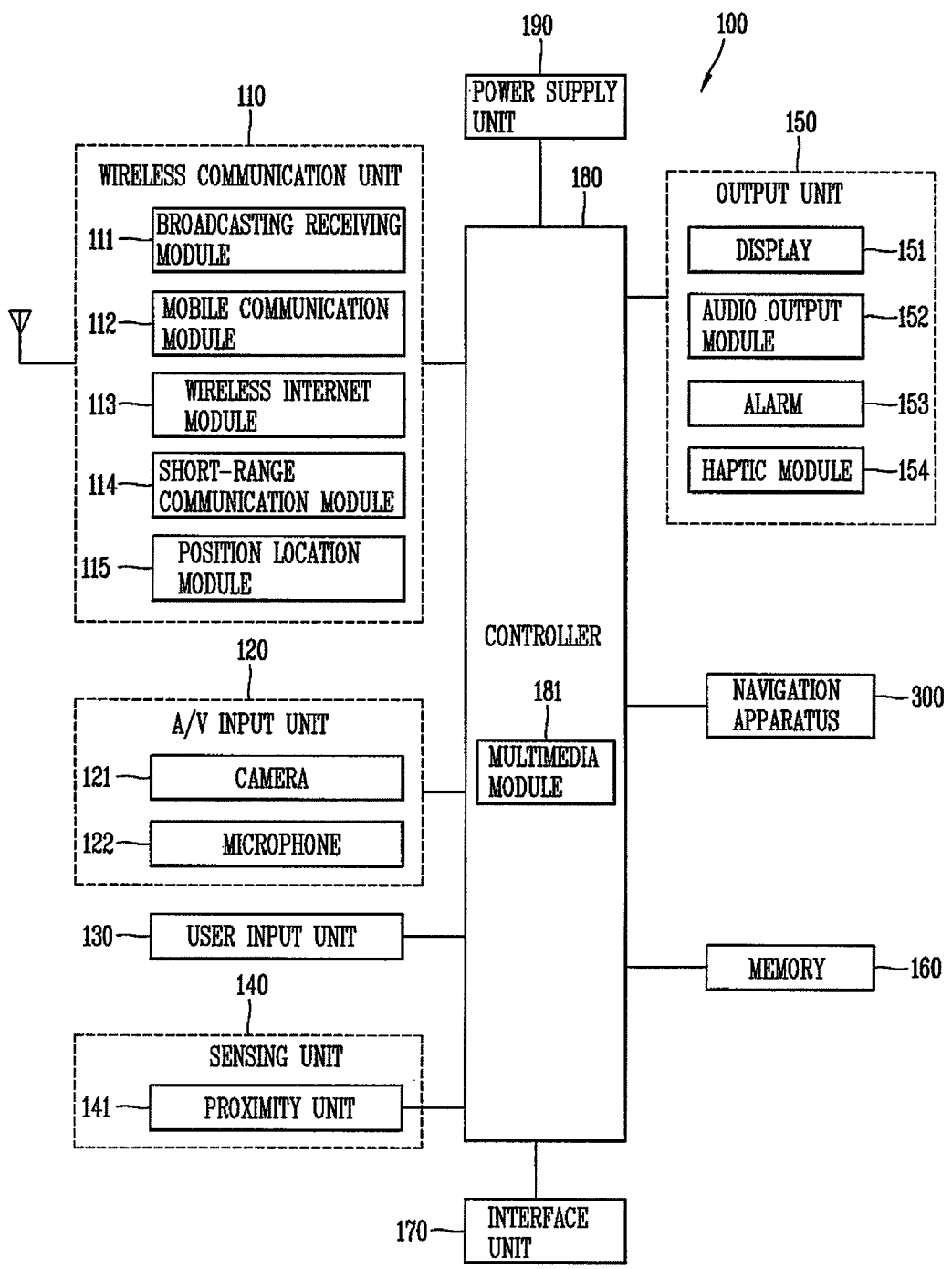
FIG. 1 is a block diagram showing a structure of a mobile terminal to which a navigation apparatus according to an embodiment of the present invention is applied.

Description will now be given in detail of the preferred embodiments of the present invention, with reference to the accompanying drawings. Here, the same or similar components will have the same reference numerals regardless of drawings, and they will not be repeatedly described.

FIG. 1 is a block diagram showing a structure of a mobile terminal 100 to which a mobile vehicle navigation apparatus 300 according to one or more embodiments of the present invention is applied. The mobile terminal 100 may be implemented as various forms. For instance, the mobile terminal 100 may include portable terminals, smart phones, notebook computers, digital multimedia broadcasting terminals, Personal Digital Assistants (PDA), Portable Multimedia Players (PMP), navigations (mobile vehicle navigation apparatus), and the like.

As shown in FIG. 1, the mobile terminal 100 of the present invention may include a wireless communication unit 110, an A/V (Audio/Video) input unit 120, a user input unit 130, a sensing unit 140, an output unit 150, a memory 160, an interface unit 170, a controller 180, a power supply unit 190, and the like. FIG. 1 shows the mobile terminal 100 having various components, but it is understood that implementing all of the illustrated components is not a requirement. Greater or fewer components may alternatively be implemented. The mobile terminal 100 may includes bodies that flip, fold or rotate.

The wireless communication unit 110 may include one or more components which permit wireless communications between the mobile terminal 100 and a wireless communication system or between the mobile terminal 100 and a network within which the mobile terminal 100 is located. For example, the wireless communication unit 110 may include at least one of a broadcasting receiving module 111, a mobile communication module 112, a wireless internet module 113, a short-range communication module 114 and a position location module 115.

The broadcasting receiving module 111 receives a broadcast signal and/or broadcast associated information from an external broadcast managing server via a broadcast channel. The broadcast channel may include a satellite channel and a terrestrial channel. The broadcast managing server may indicate a server which generates and transmits a broadcast signal and/or broadcast associated information or a server which receives a pre-generated broadcast signal and/or broadcast associated information and sends them to the mobile terminal. Examples of broadcast associated information may include information associated with a broadcast channel, a broadcast program, a broadcast service provider, and the like. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may be provided via a mobile communication network, and received by the mobile communication module 112. The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcasting receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcasting receiving module 111 may be configured to be suitable for every broadcast system transmitting broadcast signals as well as the digital broadcasting systems. Broadcast signals and/or broadcast associated information received via the broadcasting receiving module 111 may be stored in a suitable device, such as a memory 160.

The mobile communication module 112 transmits/receives wireless signals to/from at least one of network entities (e.g., a base station, an external mobile terminal, a server, etc.) on a mobile communication network. Here, the wireless signals may include audio call signal, video call signal, and/or various formats of data according to transmission/reception of text/multimedia messages.

The wireless internet module 113 supports wireless Internet access for the mobile terminal. This module may be internally or externally coupled to the mobile terminal 100. Here, examples of such wireless Internet access technology may include Wireless LAN (WLAN, Wi-FI), Wireless broadband (Wibro), World Interoperability for Microwave Access (Wimax), High Speed Downlink Package Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position location module 115 denotes a module for detecting or calculating a position of a mobile terminal. An example of the position location module 115 may include a Global Positioning System (GPS) module. The GPS module may receive position information in cooperation with associated multiple satellites. Here, the position information may include coordinates information represented by latitude and longitude. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites. Wi-Fi Positioning System and/or Hybrid Positioning System may be applied as the position location module 115.

The A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the configuration of the mobile terminal.

Further, the microphone 122 receives an external audio signal while the portable device is in a particular mode, such as a phone call mode, recording mode and voice recognition mode. The received audio signal is then processed and converted into digital data. In the calling mode, the processed voice data is converted and outputted into a form capable of transmitting to the mobile communication base station through the mobile communication module 112. Also, the microphone 122 includes assorted noise removing algorithms to remove noise generated in the course of receiving the external audio signal.

The mobile terminal 100 also includes a user input unit 130 that generates input data responsive to user manipulation of an associated input device or devices. Examples of such devices include a keypad, a dome switch, a touchpad (e.g., static pressure/capacitance), a jog wheel, a jog switch and the like.

A sensing unit 140 is also included in the mobile terminal 100 and provides status measurements of various aspects of the mobile terminal 100. For instance, the sensing unit 140 may detect an open/close status of the mobile terminal 100, a change of position of the mobile terminal 100 or a component of the mobile terminal 100, a presence or absence of user contact with the mobile terminal 100, orientation or acceleration/deceleration of the mobile terminal 100, etc. As an example, when the mobile terminal 100 is a slide-type mobile terminal, the sensing unit 140 may sense whether a sliding portion of the mobile terminal 100 is open or closed. Other examples include the sensing unit 140 sensing the presence or absence of power provided by a power supply unit 190, the presence or absence of a coupling or other connection between an interface unit 170 and an external device, etc. The sensing unit 140 may further include a proximity sensor 141.

The output unit 150 serves to output an audio signal (or an auditory signal), a video signal (or visual signal), an alarm signal or a tactile signal. The output unit 150 includes a display unit 151, an audio output module 152, an alarm 153, a haptic module 154 and the like.

The mobile terminal 100 also includes a display 151 that visually displays information associated with the mobile terminal 100. For instance, if the mobile terminal 100 is operating in a phone call mode, the display 151 will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes or the UI and GUI.

Further, the display 151 may be implemented using at least one of display technologies including, for example, a liquid crystal display (LCD), a thin film transistor-liquid crystal display (TFT-LCD), an organic light-emitting diode display (OLED), a flexible display and a three-dimensional display.

The display 151 may be implemented as a transparent type or an optical transparent type through which the exterior is viewable, which is referred to as 'transparent display'. A representative example of the transparent display may include a Transparent OLED (TOLED), and the like. The rear surface of the display 151 may also be implemented to be optically transparent. Under this configuration, a user can view an object positioned at a rear side of a terminal body through the display 151 of the terminal body.

The display 151 may be implemented in two or more in number according to a configured aspect of the mobile terminal 100. For instance, a plurality of the displays 151 may be arranged on one surface in a spacing manner or in an integrated manner, or may be arranged on different surfaces.

Here, if the display 151 and a touch sensitive sensor (referred to as a touch sensor) have a layered structure therebetween, the structure may be referred to as a touch screen. The display 151 may be used as an input device rather than an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area, but also a touch pressure. When touch inputs are sensed by the touch sensor, corresponding signals are transmitted to a touch controller (not shown). The touch controller processes the received signals, and then transmits corresponding data to the controller 180. Accordingly, the controller 180 may sense which region of the display 151 has been touched.

The proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utilization degree than a contact sensor.

The proximity sensor 141 may include a transmissive type photoelectric sensor, a direct reflective type photoelectric sensor, a mirror reflective type photoelectric sensor, a high-frequency oscillation type proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, a status that the pointer is positioned to be proximate onto the touch screen without contact will be referred to as 'proximity touch', whereas a status that the pointer substantially comes in contact with the touch screen will be referred to as 'contact touch'. The pointer in a status of 'proximity touch' is positioned so as to be vertical with respect to the touch screen.

The proximity sensor 141 senses proximity touch, and proximity touch patterns (e.g., distance, direction, speed, time, position, moving status, etc.). Information relating to the sensed proximity touch, and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., call signal reception sound, message reception sound, and so on. The audio output module 152 may include a receiver, a speaker, a buzzer, and so on.

The alarm 153 outputs signals notifying occurrence of events from the mobile terminal 100. The events occurring from the mobile terminal 100 may include call signal reception, message reception, key signal input, touch input, and so on. The alarm 153 may output not only video or audio signals, but also other types of signals such as signals notifying occurrence of events in a vibration manner. When call signals or messages are received, the alarm 153 may implement the mobile terminal 100 to vibrate through a vibration means in order to notify the reception. When key signals are input, the alarm 153 may implement the mobile terminal 100 to vibrate through a vibration means as a feedback to the input. A user can recognize occurrence of events through the vibration of the mobile terminal 100. Signals notifying occurrence of events may be output through the display 151 or the audio output module 152. The display 151 and the audio output module 152 may be categorized into a part of the alarm 153.

The haptic module 154 generates various tactile effects. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects including not only vibration, but also arrangement of pins vertically moving with respect to a skin surface contacting the haptic module 154, air injection force or air suction force through an injection hole or a suction hole, touch by a skin surface, presence or absence of contact with an electrode, effects by stimulus such as an electrostatic force, and reproduction of cold or hot feeling using a heat absorbing device or a heat emitting device.

The haptic module 154 may be configured to transmit tactile effects through a user's direct contact, or a user's muscular sense using a finger or a hand. The haptic module 154 may be implemented in two or more in number according to a configuration of the mobile terminal 100.

The memory 160 may store programs to operate the controller 180, or may temporarily store input/output data (e.g., music, still images, moving images, map data, and so on). The memory 160 may store data relating to vibration and sound of various patterns output when touches are input onto the touch screen.

The memory 160 may be implemented using any type or combination of suitable memory or storage devices including a flash memory type, a hard disk type, a multimedia card micro type, a card type (SD or XD memory), random access memory (RAM), static random access memory (SRAM), electrically erasable programmable read-only memory (EEPROM), programmable read-only memory (PROM), read-only memory (ROM), magnetic memory, magnetic or optical disk, or other similar memory or data storage device. The mobile terminal 100 may operate a web storage on the Internet, or may be operated in relation to a web storage that performs a storage function of the memory 160.

The interface unit 170 interfaces the mobile terminal 100 with all external devices connected to the mobile terminal 100. The interface 170 may include a wire/wireless headset port, an external charger port, a wire/wireless data port, a memory card port, a port to connect a device having a recognition module to the mobile terminal 100, an audio Input/Output (I/O) port, a video Input/Output (I/O) port, an earphone port, and so on. Here, the recognition module is implemented as a chip to store each kind of information to identify an authorization right for the mobile terminal 100, and may include a User Identity Module (UIM), a Subscriber Identity Module (SIM), a Universal Subscriber Identity Module (USIM), and so on. A device having the recognition module (hereinafter, will be referred to as 'identification device') may be implemented as a smart card type. Accordingly, the recognition module may be connected to the mobile terminal 100 through a port. The interface unit 170 may be configured to receive data or power from an external device to transmit the data or power to each component inside the mobile terminal 100, or may be configured to transmit data inside the mobile terminal 100 to an external device.

Under a state that the mobile terminal 100 is connected to an external cradle, the interface unit 170 serves as a passage through which power from the external cradle is supplied to the mobile terminal 100, or a passage through which each kind of command signals input from the external cradle is transmitted to the mobile terminal 100. Each kind of command signals or power input from the cradle may serve as signals notifying that the mobile terminal 100 is precisely mounted to the external cradle.

The controller 180 controls an overall operation of the mobile terminal 100. For instance, the controller 180 performs controls and processes relating to data communication, voice call, video call, and the like. The controller 180 may include a multimedia module 181 configured to play multimedia. The multimedia module 181 may be implemented inside the controller 180, or may be separately implemented from the controller 180.

The controller 180 may perform a pattern recognition process to recognize handwriting inputs or picture inputs on the touch screen, as texts or images, respectively.

The power supply unit 190 may be configured to receive external or internal power and to supply the received power to each component of the mobile terminal 100 under control of the controller 180.

In addition, the above various embodiments for the mobile terminal 100 may be implemented in a computer-readable medium using, for example, computer software, hardware, or some combination thereof.

For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in a memory (for example, the memory 160), and executed by a controller or processor (for example, the controller 180).

A navigation apparatus 300 applied to the mobile terminal 100 according to the present invention generates a route from a departure point and an arrival point and displays the generated route on the display 151 of the mobile terminal 100. When the current position of the mobile terminal 100 is within a preset region of the arrival point, the navigation apparatus 300 checks whether the arrival point is an ultimate destination. The navigation apparatus 300 then generates a new route and based upon position information including the ultimate destination set according to the result of the checking and the location of the mobile terminal 100. Accordingly, the navigation apparatus 300 transmits information relating to the generated new route to a particular terminal, or transmits the position information to the particular terminal such that a new route is generated in the particular terminal based upon the transmitted position information.

For example, the navigation apparatus 300 applied to the mobile terminal 100 according to the present invention matches a current map matching link with a current link, and generates road guidance information based on a result of the matching. Here, the current map matching link is extracted from map data corresponding to a running route from a departure point to an arrival point. Also, when the mobile terminal enters a preset region of the arrival point while displaying the road guidance information on the display 151, the navigation apparatus 300 applied to the mobile terminal 100 according to the present invention checks whether the arrival point is the ultimate destination, and then sets the ultimate destination according to the result of the checking. Afterwards, the navigation apparatus 300 generates new route related information based upon the set ultimate destination and the current position of the mobile terminal 100 and sends the generated new route related information to a particular terminal, such that the sent new route related information is displayed on the particular terminal. Also, the navigation apparatus 300 can send position information related to the set ultimate destination to the particular terminal, and generates a new route based upon the sent position information and/or position information relating to the particular terminal, so as to display the newly generated route related information on the particular terminal.

Here, functions of the navigation apparatus 300 according to the embodiment of the present invention will be executed by the navigation apparatus 300 itself or by the controller 180 of the mobile terminal 100.

Figure 2:
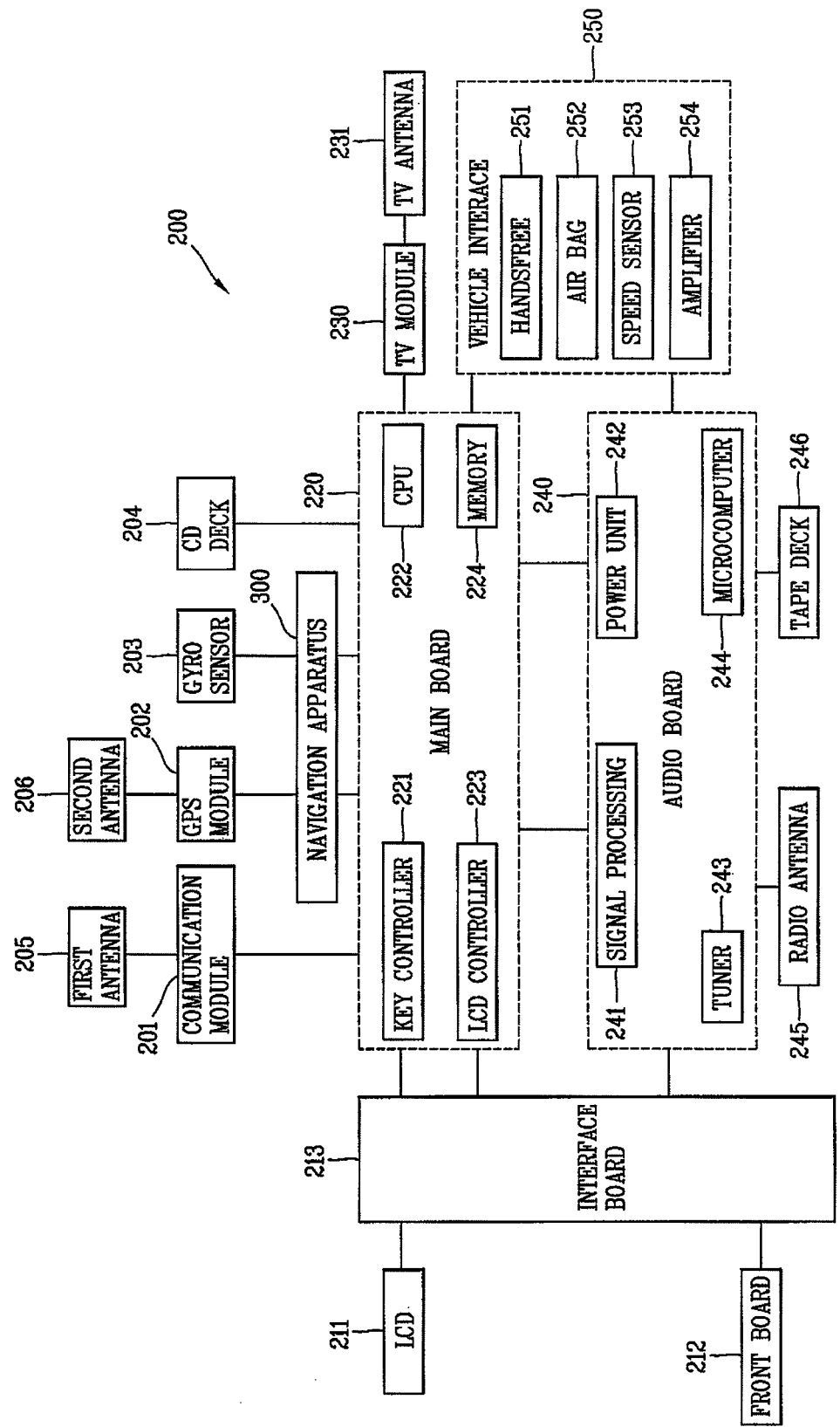
FIG. 2 is a block diagram showing a structure of a telematics terminal to which the navigation apparatus according to the embodiment of the present invention is applied.

FIG. 2 is a block diagram showing a structure of a telematics terminal 200 to which the navigation apparatus according to one or more embodiments of the present invention is applied.

Referring to FIG. 2, the telematics terminal 200 may include a main board 220. The main board 220 includes a key controller 221 for controlling a variety of key signals, a central processing unit (CPU) 222 for executing overall controls of the telematics terminal 200, an LCD controller 223 for controlling an LCD, and a memory 224 for storing each kind of information.

The memory 224 stores map information (map data) for displaying road guidance information (vehicle guidance information) on a digital map of a display (or an LCD 211).

In addition, the memory 224 stores an algorithm for controlling traffic information collection for enabling an input of traffic information depending on a road condition in which a vehicle is currently traveling, and each kind of information for controlling such an algorithm.

The main board 220 may include a communication module 201 provided with a uniquely given device number, and performing voice call and data transmission/reception through a mobile communication terminal built in a vehicle; a GPS module 202 for receiving a GPS signal to guide a position of a vehicle, track a traveling route from a depart point to an arrival point, etc., and for generating current position data of a vehicle based on the received GPS signal, or transmitting traffic information collected by a user as a GPS signal; a gyro sensor 203 for sensing a running direction of the vehicle; a CD deck 204 for reproducing a signal recorded on a compact disk (CD); and the like.

The communication module 201 and the GPS module 202 transmit/receive signals through a first antenna 205 and a second antenna 206, respectively.

Also, the main board 220 is connected to a TV module 230 for receiving broadcast signals through a TV antenna 231 (i.e., an antenna for broadcast signals).

The main board 220 is connected, via an interface board 213, to the LCD 211 controlled by the LCD controller 223.

The LCD 211 processes a broadcasting signal received through the TV module 230 through predetermined processes, and then displays the processed broadcasting signal, in the form of a video signal, on the LCD 211 via the interface board 213 under control of the LCD controller 223. And, the LCD 211 outputs an audio signal through an amplifier 254 under control of an audio board 240 that will be later explained. The LCD 211 displays each kind of video signals, or text signals based on control signals by the LCD controller 223.

The LCD 211 may be configured to receive an input from a user in a touch screen manner.

The main board 220 is connected, via the interface board 213, to a front board 212 controlled by the key controller 221. The front board 212 is provided with buttons for enabling an input of a variety of key signals so as to provide to the main board 220 a key signal corresponding to a button (or key) selected by a user. The front board 212 may be provided with a menu key for allowing a direct input of traffic information, and the menu key may be configured to be controlled by the key controller 221.

The audio board 240 is connected to the main board 220, and processes a variety of audio signals. The audio board 240 may include a microcomputer 244 for controlling the audio board 240, a tuner 243 for receiving a radio signal through an antenna (or radio antenna) 245, a power unit 242 for supplying power to the microcomputer 244, and a signal processing unit 241 for processing a variety of voice signals.

To the audio board 240, are connected the radio antenna 245 for receiving a radio signal, and a tape deck 246 for reproducing an audio tape.

An amplifier 254 is also connected to the audio board 240 so as to output a voice signal processed by the audio board 240.

The amplifier 254 is connected to a vehicle interface 250. That is, the main board 220 and the audio board 240 are connected to the vehicle interface 250, respectively. To the vehicle interface 250, may be connected a hands-free 251 for inputting a voice signal without using a driver's hands, an airbag 252 for a passenger's safety, a speed sensor 253 for sensing a vehicle speed, and the like.

The speed sensor 253 calculates a vehicle speed, and provides information relating to the calculated vehicle speed to the central processing unit 222.

Functions of the navigation apparatus 300 include general navigation functions.

The navigation apparatus 300 applied to the telematics terminal 200 generates a route between a departure point to an arrival point, and displays the generated route information on the LCD 211 of the telematics terminal 200. Afterwards, when the current position of the telematics terminal 200 is within a preset region of the arrival point, the navigation apparatus 300 checks whether the arrival point is the ultimate destination, so as to generate a new route based upon the ultimate destination set according to the result of the checking and the position of the telematics terminal 200. The navigation apparatus 300 then sends the newly generated route information to a particular terminal, or send the position information to the particular terminal and then generate a new route in the particular terminal based upon the sent position information.

For example, the navigation apparatus 300 applied to the telematics terminal 200 according to the present invention matches a current map matching link with a current link, and generates road guidance information based on a result of the matching. Here, the current map matching link is extracted from map data corresponding to a running route from a departure point to an arrival point. Also, when the mobile terminal enters a preset region of the arrival point while displaying the road guidance information on the LCD 211, the navigation apparatus 300 applied to the telematics terminal 200 according to the present invention checks whether the arrival point is the ultimate destination, and then sets the ultimate destination according to the result of the checking. Afterwards, the navigation apparatus 300 generates new route related information based upon the set ultimate destination and the current position of the telematics terminal 200 and sends the generated new route related information to a particular terminal, such that the sent new route related information is displayed on the particular terminal. Also, the navigation apparatus 300 can send position information related to the set ultimate destination to the particular terminal, and generates a new route based upon the sent position information and/or position information relating to the particular terminal, so as to display the newly generated route related information on the particular terminal.

Here, functions of the navigation apparatus 300 according to the embodiment of the present invention will be executed by the navigation apparatus 300 itself or by the central processing unit 222 of the telematics terminal 200.

Hereinafter, the navigation apparatus 300 will be explained in more detail, with reference to FIG. 3, under an assumption that the navigation apparatus 300 is applied to the telematics terminal 200. Here, the navigation apparatus 300 of the present invention may be applied not only to the telematics terminal 200, but also to the mobile terminal 100.

Figure 3:
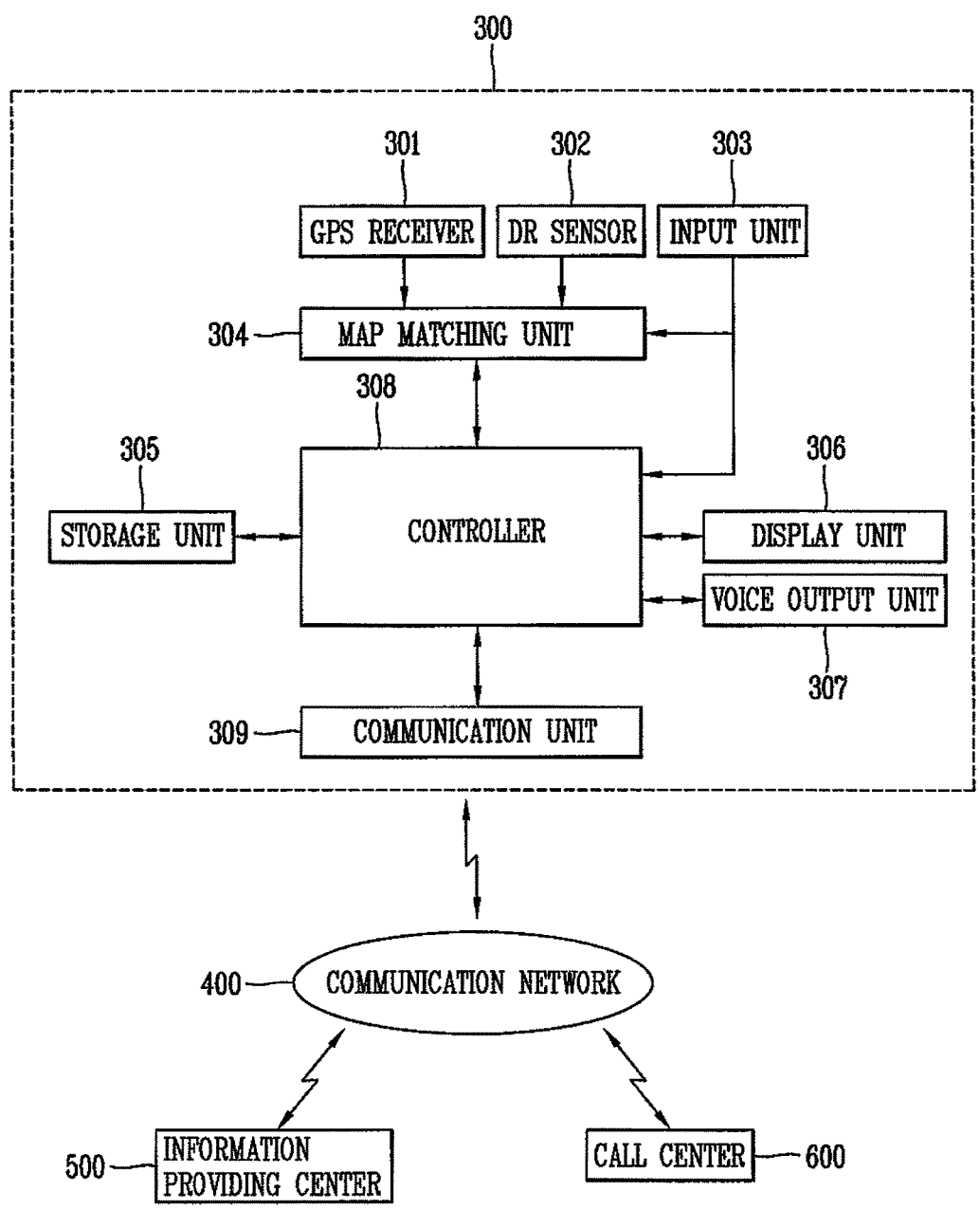
FIG. 3 is a block diagram showing a structure of the navigation apparatus according to the embodiment of the present invention.

FIG. 3 is a block diagram showing a structure of the navigation apparatus according to the present invention.

As shown in FIG. 3, the contents navigation apparatus 300 comprises a GPS receiver 301, a Dead-Reckoning (DR) sensor 302, an input unit 303, a map matching unit 304, a storage unit 305, a display unit 306, a voice output unit 307, a controller 308, and a communication unit 309.

The GPS receiver 301 receives a GPS signal from a satellite, generates in real time first position data of the navigation apparatus 300 (assumed to be the same position to the telematics terminal 200 or the mobile terminal 100) based upon latitude and longitude coordinates included in the received GPS signal, and output the generated first position data to the map matching unit 304. Here, the first position data is defined as a current position (or current position data) of the navigation apparatus 300. The position information can be received through a Wi-Fi or Wibro communication as well as the GPS receiver 301.

The signal received through the GPS receiver 301 may provide the position information relating to the terminal to the navigation apparatus 300 by using wireless communications, such as IEEE 802.11 as a wireless network standard for a wireless LAN including wireless LAN, part of Infrared Data Associations (IrDA) and the like, proposed by Institute of Electrical and Electronics Engineers (IEEE), IEEE 802.15 as a standard for a wireless Personal Area Network (PAN) including BLUETOOTH, Ultra-WideBand (UWB), Zigbee and the like, IEEE 802.16 as a standard for a wireless Metropolitan Area Network (MAN)(Broadband Wireless Access, BWA) including Fixed Wireless Access (FWA) and the like, and IEEE 802.20 as a mobile internet standard for a wireless MAN (Mobile Broadband Wireless Access, MBWA) including Wireless Broadband (Wibro), World Interoperability for Microwave Access (WiMAX) and the like.

The DR sensor 302 calculates a running direction and running speed of a vehicle when the terminal (i.e., navigation apparatus 300) is built in the corresponding vehicle, generates second position data based upon the calculated running direction of the vehicle and the running speed thereof, and outputs the generated second position data to the map matching unit 304.

Here, a technology of generating a presumptive position of the navigation apparatus (or the mobile terminal or vehicle) based upon the first position data generated by the GPS receiver 301 and the second position data generated by the DR sensor 302 is well known to those skilled in the art, and thus a detailed description thereof will be omitted.

The input unit 303 receives a button input by a user or a command or control signal in cooperation with a manipulation, such as touching/scrolling a display screen.

The input unit 303 may also be configured for a user to select his desired function or input information, and may be configured as various devices, such as a keypad, a touch screen, a jog wheel, a microphone and the like.

The map matching unit 304 generates a presumptive vehicle position based upon the first and second position data, and reads out map data corresponding to a running route from the storage unit 305.

The map matching unit 304 also matches the presumptive vehicle position with links (roads) included in the map data, and outputs the matched map information (i.e., the map matching result) to the controller 308. For instance, the map matching unit 304 generates the presumptive vehicle position based upon the first and second position data, and then matches the generated presumptive vehicle position with the links included in the map data stored in the storage unit 305 in a sequential manner, so as to output the matched map information (i.e., the map matching result) to the controller 308.

The map matching unit 304 also outputs to the controller 308 a road attribute information, such as a single story road or a multi story road, which is included in the matched map information (i.e., the map matching result).

Such functions of the map matching unit 304 can be implemented by the controller 308.

The storage unit 305 stores map data.

The storage unit 305 also stores various types of information, including a variety of menu screens, point of interest (POI), information related to each function according to a specific position of the map data and the like.

The storage unit 305 also stores a variety of user interfaces (UIs) and/or graphic user interfaces (GUIs).

In addition, the storage unit 305 stores data and programs required for the operation of the navigation apparatus 300.

The display unit 306 displays graphic information (or a road guidance map) included in the road guidance information generated by the controller 308. Here, the display unit 306 can be a touch screen.

The display unit 306 may display various contents such as different menu screens and road guidance information using UIs and/or GUIs stored in the storage unit 305. Here, the contents displayed on the display unit 306 may include menu screens having various texts or image data (map data or each kind of information data), icons, list menus and combo boxes.

The voice output unit 307 outputs voice information included in the road guidance information (or voice message for the road guidance information) generated by the controller 308. Here, the voice output unit 307 may be implemented as a speaker.

The controller 308 generates road guidance information based upon the matched map information, and then outputs the generated road guidance information to the display unit 306 and the voice output unit 307. Here, the display unit 306 displays the road guidance information.

Also, the controller 308 receives real-time traffic information from an information providing center 500 connected thereto via a wired/wireless communication network 400. The received real-time traffic information is used upon the generation of the road guidance information.

The controller 308 may be connected to a call center 600 via the communication unit 309, so as to execute a call communication or allows transmission/reception of information between the navigation apparatus 300 and the call center 600. Here, the communication unit 309 may be implemented as a hands-free module having a BLUETOOTH function employing a short-range wireless communication technique.

The controller 308 retrieves a route (path) based upon start point and arrival point or upon an arrival point, and outputs the retrieval result to the display unit 306.

Also, when the current position of the navigation apparatus 300 is near the arrival point upon the traveling, then the controller 308 may check whether or not the arrival point is the ultimate destination. And, the controller 308 may generate a new route between the current position of the navigation apparatus 300 and the ultimate destination according to the checked result, so as to send to a particular terminal.

In addition, when the current position of the navigation apparatus 300 is near the arrival point during the driving, then the controller 308 may check whether or not the arrival point is the ultimate destination, and send to the particular terminal either position information (or position related information) related to the ultimate destination or position (related) information related to both the ultimate destination and the current position of the navigation apparatus 300 according to the checked result.

When the current position of the navigation apparatus 300 is near the arrival point during the traveling, then the controller 308 generates a new route based upon position information related to the arrival point, so as to send the newly generated route to a particular terminal or send the position information to the particular terminal. Here, the position information may include the arrival point, or include the arrival point and the current position of the navigation apparatus 300.

Here, part (or all) of the components provided in the navigation apparatus 300 illustrated in FIG. 3 according to the present invention, including the GPS receiver 301, the DR sensor 302, the input unit 303, the map matching unit 304, the storage unit 305, the display unit 306, the voice output unit 307, the controller 308 and the communication unit 309, may be substituted with components having similar functions in the mobile terminal 100.

That is, the GPS receiver 301 may be the position location module 115 of the mobile terminal 100, the DR sensor 302 may be the sensing unit 140 of the mobile terminal 100, the input unit 303 may be the user input unit 130 of the mobile terminal 100, the storage unit 305 may be the memory 160 of the mobile terminal 100, and the display unit 306 may be the display 151 of the mobile terminal 100. Also, the voice output unit 307 may be the voice output module 152 of the mobile terminal 100, and the communication unit 309 may be the wireless communication unit 110 of the mobile terminal 100. Also, the functions of the map matching unit 304 and the controller 308 may be executed by the controller 180 of the mobile terminal 100. Alternatively, the map matching unit 304 and the controller 308 may be implemented as an independent module in the mobile terminal 100.

Furthermore, part (or all) of the components provided in the navigation apparatus 300 illustrated in FIG. 3 according to the present invention, including the GPS receiver 301, the DR sensor 302, the map matching unit 304, the storage unit 305, the display unit 306, the voice output unit 307, the controller 308 and the communication unit 309, may be substituted with components having similar functions in the telematics terminal 200.

That is, the GPS receiver 301 may be the GPS module 202 of the telematics terminal 200, the DR sensor 302 may be the gyro sensor 203 of the telematics terminal 200, the storage unit 305 may be the memory 224 of the telematics terminal 200, and the display unit 306 may be the LCD 211 of the telematics terminal 200. Also, the voice output unit 307 may be the amplifier 254 of the telematics terminal 200, and the communication unit 309 may be the communication module 201 of the telematics terminal 200. Also, the functions of the map matching unit 304 and the controller 308 may be executed by the central processing unit 222 of the telematics terminal 200.

As such, a first terminal cooperates with a second terminal so as to share position information relating to a destination (arrival point) with each other, thus to enhance convenience and efficiency of use.

Hereinafter, a navigation method according to the present invention will be described in detail with reference to FIGS. 1 to 3.

Figure 4:
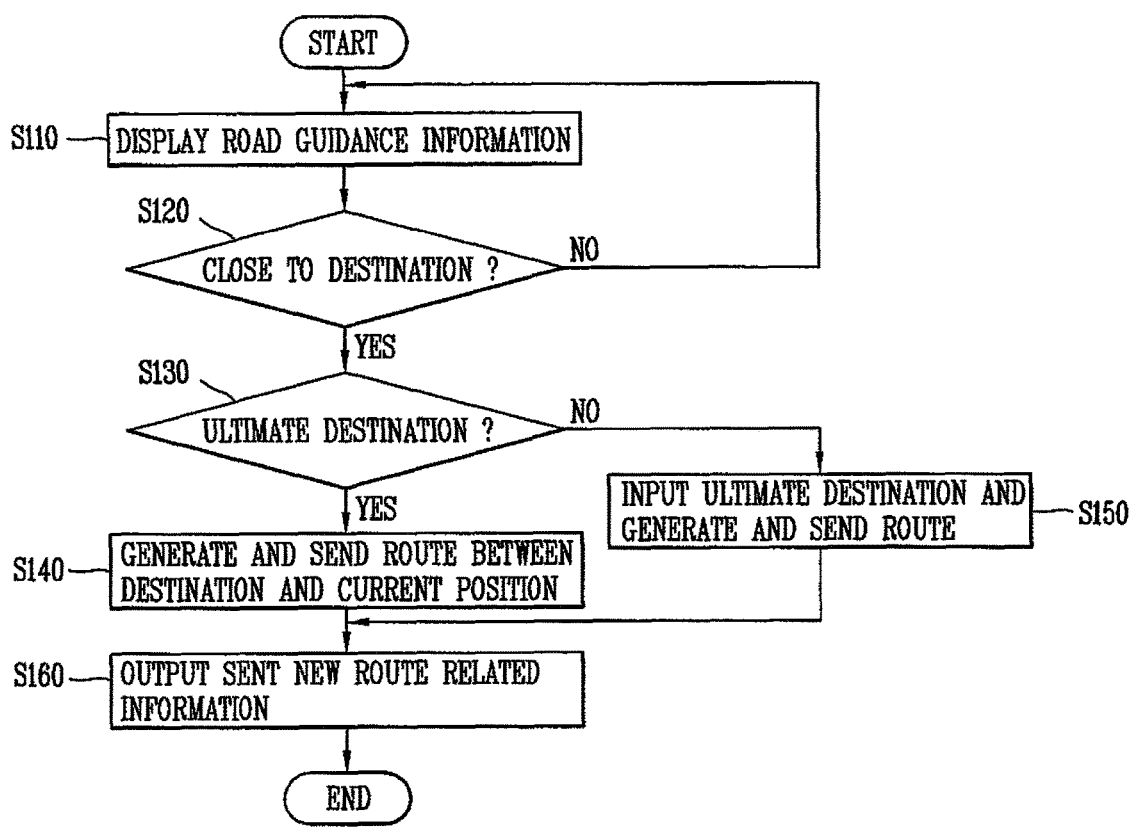
FIG. 4 is a flowchart showing a navigation method in accordance with a first embodiment of the present invention.

FIG. 4 is a flowchart showing a navigation method in accordance with a first embodiment of the present invention First, the map matching unit 304 generates first position data and/or second position data based upon signals respectively received by the GPS receiver 301 and/or the DR sensor 302, and generates a current presumptive position based upon the generated first and/or second position data. Afterwards, the map matching unit 304 reads out map data corresponding to a running route from the storage unit 305. Here, the running route refers to a route from a starting point to an arrival point.

The map matching unit 304 then matches the presumptive position with links (roads) included in the map data, and outputs the matched map information (i.e., map matching result) to the controller 308. For example, the map matching unit 304 generates the presumptive position based upon the first and second position data and then matches the generated presumptive position with the links within the map data stored in the storage unit 305 in a sequential manner, to thereafter output the matched map information (i.e., map matching result) to the controller 308. Here, the matched map information (i.e., map matching result) corresponds to information generated by referring to preset user information, a road condition using Transport Protocol Expert Group (TPEG) information or the like, current status information of a vehicle (e.g., oil state (e.g., pressure/level/temperature), air pressure state of tire, etc.) and the like.

Afterwards, the controller 308 generates road guidance information based upon the matched map information, and outputs the road guidance information to the display unit 306 and the voice output unit 307 (S110).

The controller 308 then determines whether the navigation apparatus 300 is currently positioned near the arrival point. Here, the determination as to whether the navigation apparatus 300 is currently positioned near the arrival point is to determine whether or not the navigation apparatus 300 is currently positioned within a range (or a radius) preset based upon the arrival point.

As one example, assuming that the arrival point is 'City Hall' and the navigation apparatus 300 enters (or is positioned) within a radius of 500 m, as a preset range based upon the City Hall, the navigation apparatus 300 is determined to be near the arrival point, namely, the City Hall (S120).

Figure 5:
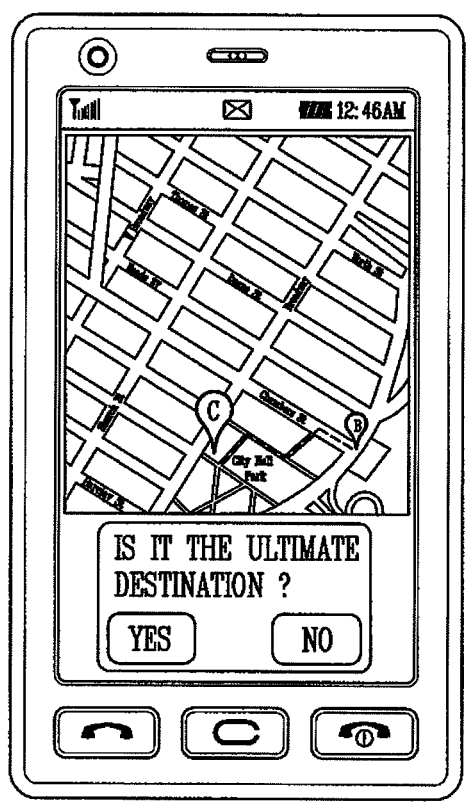
FIG. 5 is a view showing a pop-up window for confirming a ultimate destination in accordance with an embodiment of the present invention.

If the navigation apparatus 300 is determined to be near the arrival point, then the navigation apparatus 300 checks whether the arrival point is the ultimate destination. In one embodiment, checking whether the arrival point is the ultimate destination is implemented such that a GUI screen such as a pop-up window is used, as shown in FIG. 5, to output a message for inquiring whether the arrival point (or an initially inputted arrival point) is the ultimate. In reply, the user selects an input value such as 'Yes' or 'No', responsive to the outputted message. Accordingly, the navigation apparatus 300 confirms whether the arrival point is the ultimate destination based upon the input value (S130).

According to the check result, if the arrival point is the ultimate destination, the controller 308 generates a new route between the current position and the arrival point, and then sends information relating to the newly generated route to a particular terminal (S140).

On the other hand, if the arrival point is not the ultimate destination according to the check result, the controller 308 receives the ultimate destination from the user.

Afterwards, a new route is generated based upon the input ultimate destination and the current position of the navigation apparatus 300, and then information related to the newly generated route is wirelessly sent to the particular terminal (S150). In another embodiment, the information related to the newly generated route is sent to the particular terminal via a wired connection.

The particular terminal then outputs the information related to the new route sent in the steps (S140 or S150) to via a corresponding terminal display and/or voice output unit. Here, the sent information related to the new route, as shown in FIG. 6, may be one of map data in a graphic format (see FIG. 6(*a*)), abbreviated map data in a graphic format (see FIG. 6(*b*)), data in a turn-by-turn list format (see FIG. 6(*c*)), data in a text format (see FIG. 6(*d*)), data in an animation format, and data in a multimedia format providing video information about a route (an actual route). Here, upon displaying the data, the particular terminal can reproduce the video information corresponding to a straight section included in the route at a speed faster than a typical reproduction speed, and reproduce the video information corresponding to a curved section included in the route at a speed slower than the typical reproduction speed. The map data in the graphic format shown in FIG. 6(*a*) indicates a new route 700 generated between the ultimate destination (i.e., point B) and the current position of the navigation apparatus 300 (point C) based upon the map data displayed at the navigation apparatus 300 or terminal (i.e., point C). Also, the abbreviated map data in the graphic format shown in FIG. 6(*b*) indicates a new route 700 generated in the limited (or abbreviated) map data between the ultimate destination (i.e., point B) and the current position of the navigation apparatus 300 (i.e., point C) in the map data shown in FIG. 6(*a*). The data in the turn-by-turn list format shown in FIG. 6(*c*) indicates a route from the current position (i.e., point C) of the navigation apparatus 300 to the ultimate destination (i.e., point B) in the turn-by-turn list format. Also, the data in the text format shown in FIG. 6(*d*) indicates a route from the current position (i.e., point C) of the navigation apparatus 300 to the ultimate destination (i.e., point B) in text format. In one embodiment, voice data corresponding to the data in the text format can be included in the information related to the new route together with the data in the text format.

The particular terminal may be one of mobile phone, portable terminal, smart phone, notebook computer, digital broadcasting terminal, personal digital assistants (PDA), portable multimedia player (PMP), WiBro terminal, telematics terminal, wireless terminal and navigation (vehicle navigation apparatus).

Also, the information (or data) transmission between the navigation apparatus 300 and the particular terminal may be implemented using BLUETOOTH, IrDA, UWB, ZigBee, wired/wireless universal serial bus (USB) (S160).

Figure 6A:
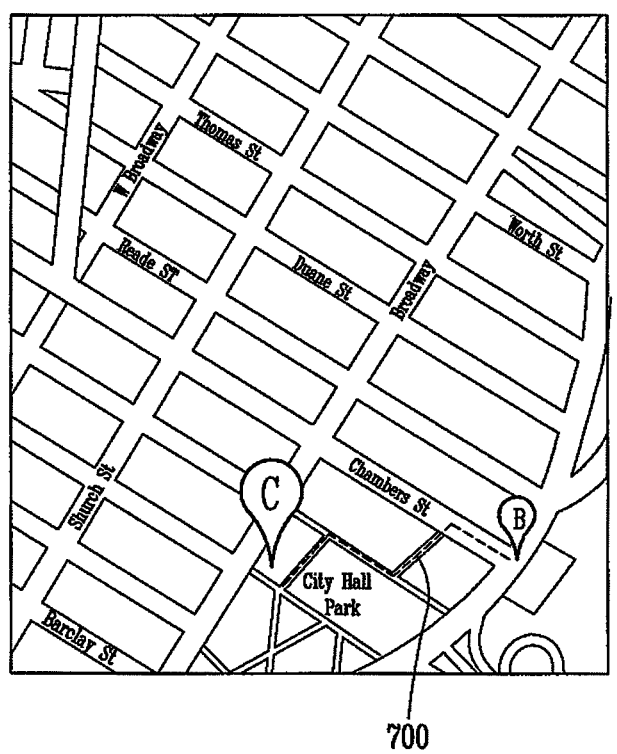
FIGS. 6A to 6D are exemplary views showing information related to a newly generated route in accordance with an embodiment of the present invention.
Figures 6B, 6C:
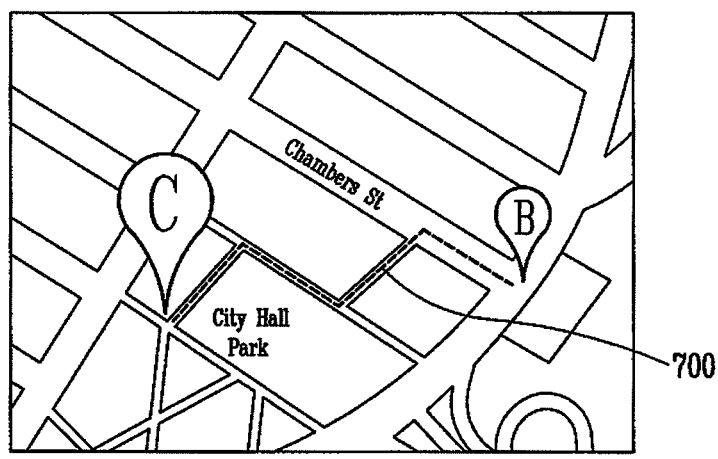
Figures 6D, 7:
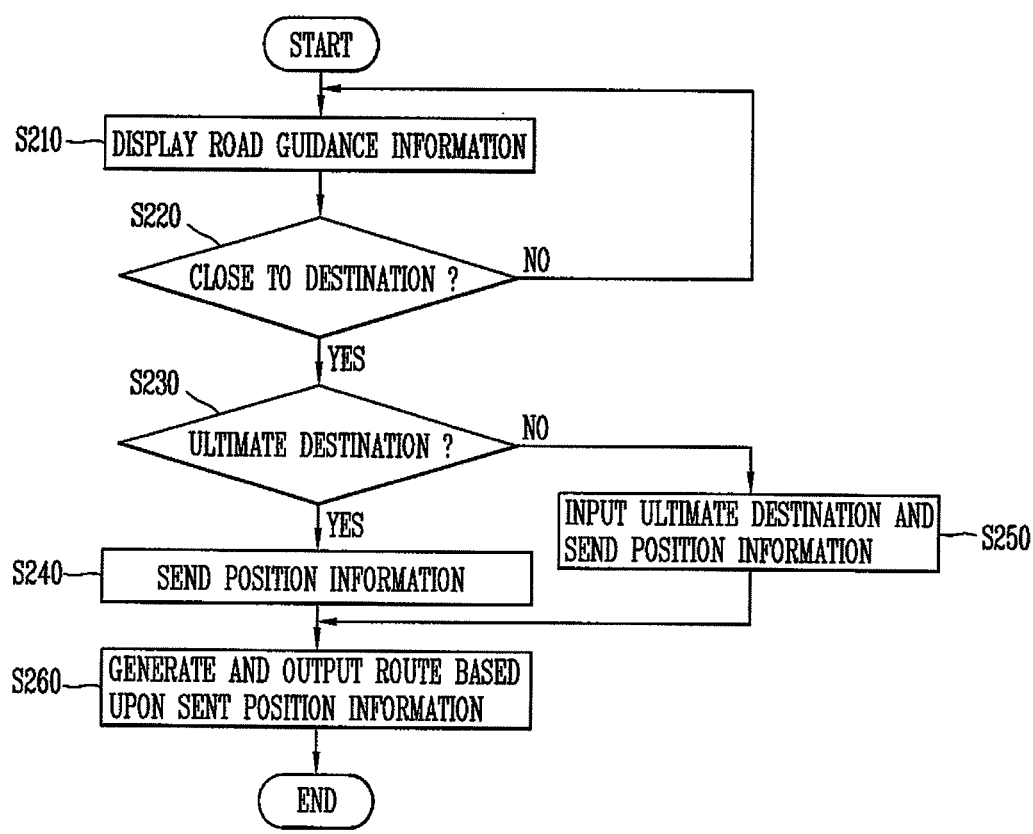
FIG. 7 is a flowchart showing a navigation method in accordance with a second embodiment of the present invention.

FIG. 7 is a flowchart showing a navigation method in accordance with a second embodiment of the present invention.

First, the map matching unit 304 generates first position data and/or second position data based upon signals respectively received by the GPS receiver 301 and/or the DR sensor 302, and generates a current presumptive position based upon the generated first and/or second position data. Afterwards, the map matching unit 304 reads out map data corresponding to a running route from the storage unit 305. Here, the running route refers to a route from a starting point to an arrival point.

The map matching unit 304 then matches the presumptive position with links (roads) included in the map data, and outputs the matched map information (map matching result) to the controller 308. For example, the map matching unit 304 generates the presumptive position based upon the first and second position data and then matches the generated presumptive position with the links within the map data stored in the storage unit 305 in a sequential manner, to thereafter output the matched map information (map matching result) to the controller 308. Here, the matched map information (map matching result) corresponds to information generated by referring to preset user information, a road condition using Transport Protocol Expert Group (TPEG) information or the like, a current status information of a vehicle (e.g., oil state, air pressure state of tire, etc.) and the like.

Afterwards, the controller 308 generates road guidance information based upon the matched map information, and outputs the road guidance information to the display unit 306 and the voice output unit 307 (S210).

The controller 308 then determines whether the navigation apparatus 300 is currently positioned near the arrival point. Here, the determination as to whether the navigation apparatus 300 is currently positioned near the arrival point is to determine whether or not the navigation apparatus 300 is currently positioned within a range (or a radius) preset based upon the arrival point (S220).

If the navigation apparatus 300 is determined to be near the arrival point, then the navigation apparatus 300 checks whether the arrival point is the ultimate destination. In one embodiment, checking whether the arrival point is the ultimate destination is implemented such that a GUI screen such as a pop-up window is used, as shown in FIG. 5, to output a message for inquiring whether the arrival point (or an initially inputted arrival point) is the ultimate destination. In reply, the user selects an input value such as 'Yes' or 'No', responsive to the outputted message. Accordingly, the navigation apparatus 300 confirms whether the arrival point is the ultimate destination based upon the input value (S230).

If the arrival point is the ultimate destination according to the check result, the position information is sent to a particular terminal via a wireless or wired connection. Here, the sent position information (or position related information) may be either information relating to the ultimate destination or information relating to the ultimate destination and the current position of the navigation apparatus 300 (S240).

If the arrival point is not the ultimate destination according to the check result, the ultimate destination is input by a user.

Afterwards, such position information relating to the input ultimate destination or position information related to the input ultimate destination and the current position of the navigation apparatus 300 is sent to the particular terminal (S250).

The particular terminal then generates a new route based upon the position information sent in the step (S240 or S250), and outputs the newly generated route to its display and/or voice output unit. Here, the sent information related to the new route, as shown in FIG. 6, may be one of map data in a graphic format (see FIG. 6(*a*)), abbreviated map data in a graphic format (see FIG. 6(*b*)), data in a turn-by-turn list format (see FIG. 6(*c*)), data in a text format (see FIG. 6(*d*)), data in an animation format, and data in a multimedia format providing video information about a route (an actual route). Here, upon displaying the data, the particular terminal can reproduce the video information corresponding to a straight section included in the route at a speed faster than a typical reproduction speed, and reproduce the video information corresponding to a curved section included in the route at a speed slower than the typical reproduction speed.

For instance, when the arrival point is the ultimate destination, the position information sent from the navigation apparatus 300 to the particular terminal denotes the position information relating to the arrival point, or the position information relating both to the arrival point and to the current position of the navigation apparatus 300. If the position information includes only the information relating to the arrival point, the particular terminal generates a new route based upon the information relating to the arrival point and current position information related to the particular terminal and then outputs the newly generated route. That is, when the information relating to the arrival point is only sent, the particular terminal generates a new route based upon the current position information thereof and the information relating to the arrival point and then outputs the new route. Also, when the position information includes the information relating to the arrival point and the current position information related to the navigation apparatus 300, the particular terminal then generates a new route based upon the information relating to the arrival point and the current position information related to the navigation apparatus 300 and/or the current position information related to the particular terminal itself so as to output the newly generated route. Here, the current position of the particular terminal denotes position data obtained by using position data generated based upon signals received via the GPS receiver and/or the DR sensor provided in the particular terminal.

As another example, when the arrival point is not the ultimate destination, the position information sent from the navigation apparatus 300 to the particular terminal may be either information related to the ultimate destination input by the user, or position information including the information related to the ultimate destination input by the user and the current position information related to the navigation apparatus 300. When the position information includes only the information related to the ultimate destination input by the user, the particular terminal then generates a new route based upon the information related to the ultimate destination input by the user and current position information related to the particular terminal itself and outputs the newly generated route. When the position information includes the information related to the ultimate destination input by the user and the current position information of the navigation apparatus 300, the particular terminal generates a new route based upon the information related to the ultimate destination input by the user and the current position information related to the navigation apparatus 300 and/or the current position information related to the particular terminal itself, and then outputs the newly generated route (S260).

Figure 8:
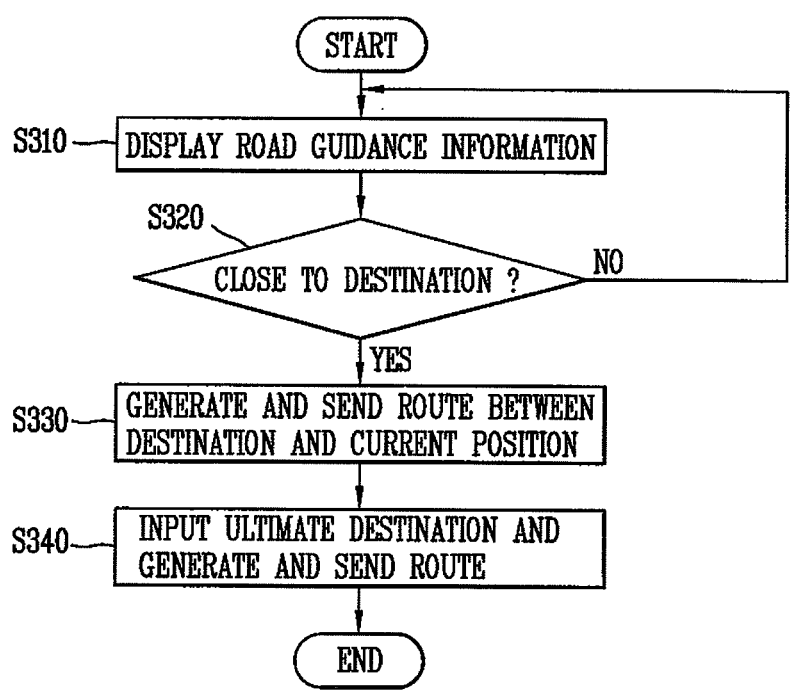
FIG. 8 is a flowchart showing a navigation method in accordance with a third embodiment of the present invention.

FIG. 8 is a flowchart showing a navigation method in accordance with a third embodiment of the present invention.

First, the map matching unit 304 generates first position data and/or second position data based upon signals respectively received via the GPS receiver 301 and/or the DR sensor 302, and generates a current presumptive position based upon the generated first and/or second position data. Afterwards, the map matching unit 304 reads out map data corresponding to a running route from the storage unit 305. Here, the running route refers to a route from a starting point to an arrival point.

The map matching unit 304 matches the presumptive position with links (roads) included in the map data, and outputs the matched map information (map matching result) to the controller 308. For example, the map matching unit 304 generates the presumptive position based upon the first and second position data and then matches the generated presumptive position with the links within the map data stored in the storage unit 305 in a sequential manner, to thereafter output the matched map information (map matching result) to the controller 308. Here, the matched map information (map matching result) corresponds to information generated by referring to preset user information, a road condition using Transport Protocol Expert Group (TPEG) information or the like, a current status information of a vehicle (e.g., oil state, air pressure state of tire, etc.) and the like.

Afterwards, the controller 308 generates road guidance information based upon the matched map information, and outputs the road guidance information to the display unit 306 and the voice output unit 307 (S310).

The controller 308 then determines whether the navigation apparatus 300 is currently positioned near the arrival point. Here, the determination as to whether the navigation apparatus 300 is currently positioned near the arrival point is to determine whether or not the navigation apparatus 300 is currently positioned within a range (or a radius) preset based upon the arrival point (S320).

According to the check result, if the navigation apparatus 300 is currently positioned near the arrival point, the controller 308 generates a new route between the current position of the navigation apparatus 300 and the arrival point, and then sends information relating to the newly generated route to a particular terminal (S330).

The particular terminal then outputs the information related to the new route to its display and/or voice output unit. Here, the sent information related to the new route, as shown in FIG. 6, may be one of map data in a graphic format (see FIG. 6(a)), abbreviated map data in a graphic format (see FIG. 6(b)), data in a turn-by-turn list format (see FIG. 6(c)), data in a text format (see FIG. 6(d)), data in an animation format, and data in a multimedia format providing video information about a route (an actual route). Here, upon displaying the data, the particular terminal can reproduce the video information corresponding to a straight section included in the route at a speed faster than a typical reproduction speed, and reproduce the video information corresponding to a curved section included in the route at a speed slower than the typical reproduction speed (S340).

Figure 9:
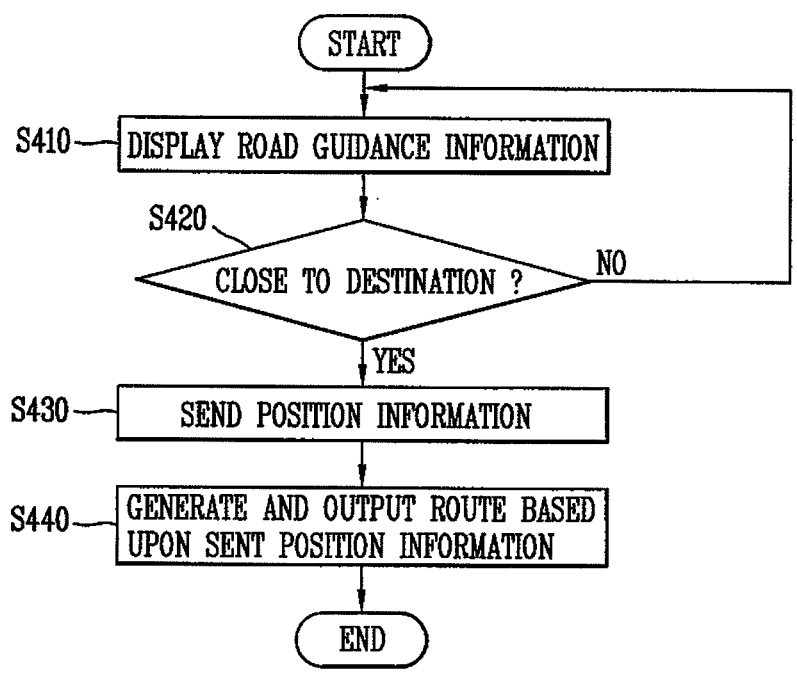
FIG. 9 is a flowchart showing a navigation method in accordance with a fourth embodiment of the present invention.

FIG. 9 is a flowchart showing a navigation method in accordance with a fourth embodiment of the present invention.

First, the map matching unit 304 generates first position data and/or second position data based upon signals respectively received via the GPS receiver 301 and/or the DR sensor 302, and generates a current presumptive position based upon the generated first and/or second position data. Afterwards, the map matching unit 304 reads out map data corresponding to a running route from the storage unit 305. Here, the running route refers to a route from a starting point to an arrival point.

The map matching unit 304 then matches the presumptive position with links (roads) included in the map data, and outputs the matched map information (map matching result) to the controller 308. For example, the map matching unit 304 generates the presumptive position based upon the first and second position data and then matches the generated presumptive position with the links within the map data stored in the storage unit 305 in a sequential manner, to thereafter output the matched map information (map matching result) to the controller 308. Here, the matched map information (map matching result) corresponds to information generated by referring to preset user information, a road condition using Transport Protocol Expert Group (TPEG) information or the like, a current status information of a vehicle (e.g., oil state, air pressure state of tire, etc.) and the like.

Afterwards, the controller 308 generates road guidance information based upon the matched map information, and outputs the road guidance information to the display unit 306 and the voice output unit 307 (S410).

The controller 308 then determines whether the navigation apparatus 300 is currently positioned near the arrival point. Here, the determination as to whether the navigation apparatus 300 is currently positioned near the arrival point is to determine whether or not the navigation apparatus 300 is currently positioned within a range (or a radius) preset based upon the arrival point (S420).

If the navigation apparatus 300 is determined to be near the arrival point, the position information is sent to a particular terminal. Here, the sent position information may be either information related to the arrival point, or position information including the information related to the arrival point and the current position information related to the navigation apparatus 300 (S430).

Then, the particular terminal generates a new route based upon the sent position information and outputs the newly generated route on a display and/or a voice output unit thereof. Here, the information related to the newly generated route, as shown in FIG. 6, may be one of map data in a graphic format (see FIG. 6(a)), abbreviated map data in a graphic format (see FIG. 6(b)), data in a turn-by-turn list format (see FIG. 6(c)), data in a text format (see FIG. 6(d)), data in an animation format, and data in a multimedia format providing video information about a route (an actual route). Here, upon displaying the data, the particular terminal can reproduce the video information corresponding to a straight section included in the route at a speed faster than a typical reproduction speed, and reproduce the video information corresponding to a curved section included in the route at a speed slower than the typical reproduction speed.

For instance, when the sent position information includes only the information related to the arrival point, the particular terminal generates a new route based upon the current position information thereof and outputs the newly generated route. Also, when the sent position information includes both the information related to the arrival point and the current position information related to the navigation apparatus 300, the particular terminal generates a new route based upon the information related to the arrival point and the current position information related to the navigation apparatus 300 and/or the current position information of the particular terminal itself so as to output the newly generated route. Here, the current position of the particular terminal denotes position data obtained by using position data generated based upon signals received via the GPS receiver and/or the DR sensor provided in the particular terminal (S440).

As such, in the navigation methods shown in FIGS. 4 to 9, the particular terminal and/or the navigation apparatus 300 are/is provided with common or interoperable software (or program) to output route information using the software, or provided with different types of software to output the route information using the corresponding software.

For example, in case where the navigation apparatus 300 and the particular terminal have the same software, information related to the newly generated route by the navigation apparatus 300 can be used without processing or changes. That is, the screen of FIG. 6(a) displayed on the navigation apparatus 300 may equally be displayed even on the particular terminal using the same software.

In addition, in case where the navigation apparatus 300 and the particular terminal have the same software or different software, as shown in FIGS. 6(b) to 6(d), the information related to the newly generated route by the navigation apparatus 300 may be one of map data in an image file format (see FIG. 6(b)) turn-by-turn list format (or an image file in the form of an outline (see FIG. 6(c)), which is route focused information, or data in the text format (see FIG. 6(d)), all based upon the current position of the navigation apparatus 300 and the arrival point. As such, such data in the image file format, the turn-by-turn list format or the text format can be sent to the particular terminal, and the sent data can be output using the software provided in the particular terminal.

Also, in case where the navigation apparatus 300 and the particular terminal have the same software or different software, upon receiving position information and generating new route related information based on the position information in the particular terminal, the newly generated route related information may be one of the map data in the image file format (or an image file in the form of an outline), the data in the turn-by-turn list format, or the data in the text format.

FIG. 10 is a flowchart showing a navigation method in accordance with a fifth embodiment of the present invention.

First, a first map matching unit provided in a first terminal generates first position data and/or second position data based upon signals respectively received via a first GPS receiver and/or a first DR sensor disposed in the first terminal, and calculates a current presumptive position based upon the first and/or second position data. Afterwards, the first map matching unit reads out map data corresponding to a running route from a first storage unit disposed in the first terminal. Here, the running route denotes a traveling route from a starting point to an arrival point.

The first map matching unit matches the presumptive position with links (roads) included in the map data, and outputs the matched map information (i.e., the map matching result) to a first controller disposed in the first terminal. For example, the first map matching unit generates the presumptive position based upon the first and second data, and matches the generated presumptive position with the links within the map data stored in the first storage unit in a sequential manner, so as to output the matched map information (i.e., the map matching result) to the first controller. Here, the matched map information (i.e., the map matching result) corresponds to information generated by referring to preset user information, a road condition using Transport Protocol Expert Group (TPEG) information or the like, current status information of a vehicle (e.g., oil state, air pressure state of tire, etc.) and the like.

Afterwards, the first controller generates road guidance information based upon the matched map information and outputs the generated road guidance information to a first display and a first voice output unit disposed in the first terminal.

The first controller determines whether the first terminal is currently positioned near the arrival point. Here, the determination as to whether the first terminal is currently positioned near the arrival point is to determine whether or not the first terminal is currently positioned within a range (or a radius) preset based upon the arrival point (S510).

If the first terminal is positioned near the arrival point according to the determination, the first controller generates a new route between the current position of the first terminal and the arrival point, and sends information related to the newly generated route to an information providing center 500 and/or a call center 600.

If the first terminal is positioned near the arrival point according to the determination, the first controller may send, to the information providing center 500 and/or the call center 600, information related to the arrival point (or an ultimate destination) or position information related both to the arrival point and to the current position of the first terminal.

In addition, if the first terminal is positioned near the arrival point, the first controller checks whether the arrival point is the ultimate destination. According to the checked result, if the arrival point is not the ultimate destination, the first controller may receive a new ultimate destination so as to use the input ultimate destination (S520).

Afterwards, a second terminal requests, from the information providing center 500 and/or the call center 600, the transmission of the sent newly generated route related information or the position information. Here, the second terminal can be authenticated so as to determine whether the corresponding information (i.e., the newly generated route related information or the position information) is enabled to be sent from the information providing center 500 and/or the call center 600 to the second terminal (S530).

The information providing center 500 and/or the call center 600 then sends to the second terminal the newly generated route related information or the position information received from the first terminal, responsive to the request for the transmission of the information by the second terminal (S540).

Then, the second terminal executes certain processes for the received route related information or the position information, and then outputs the result of the execution to its second display and/or second voice output unit.

That is, when the received information is the new route related information, then the second terminal outputs the received new route related information to the second display and/or the second voice output unit thereof. Here, the new route related information, as shown in FIG. 6, may be one of map data in a graphic format (see FIG. 6(a)), abbreviated map data in a graphic format (see FIG. 6(b)), data in a turn-by-turn list format (see FIG. 6(c)), data in a text format (see FIG. 6(d)), data in an animation format, and data in a multimedia format providing video information about a route (an actual route). Here, upon displaying the data, the particular terminal can reproduce the video information corresponding to a straight section included in the route at a speed faster than a typical reproduction speed, and reproduce the video information corresponding to a curved section included in the route at a speed slower than the typical reproduction speed.

Also, when the received information is the position information, then the second terminal generates a new route based upon the position information related to the arrival point, or upon the position information related to the arrival point and the current position of the first terminal. That is, when the position information includes the information related to the arrival point, the second terminal newly generates a first route based upon the arrival point and its position, and then outputs the newly generated first route to the second display and/or the second voice output unit. Also, when the position information includes both the arrival point and the current position of the first terminal, the second terminal newly generates a second route based upon the arrival point and the current position of the first terminal, and then outputs the newly generated second route to the second display and/or the second voice output unit (S550).

As such, the information providing center 500 and/or the call center 600 can be configured to serve as an intermediary or a server between the first and second terminals. Also, the interconnection among the first and second terminals and the information providing center 500 (or the call center 600) can be implemented using a wired/wireless communication technology.

The first and second mobile terminals described above may be implemented as various forms. Examples of the forms may include portable terminals, smart phones, notebook computers, digital broadcasting terminals, Personal Digital Assistants (PDA), Portable Multimedia Players (PMP), WiBro terminals, telematics terminals, wireless terminals, navigations (mobile vehicle navigation apparatus), and the like.

In the navigation apparatus and method according to the above-described embodiments of the present invention, the first and second terminals cooperate with each other so as to share information related to route guidance, so as to enhance the convenience of use.

Also, in the navigation apparatus and method according to the above-described embodiments of the present invention, the second terminal is allowed to provide position information related to an arrival point which is currently being provided by the first terminal, such that the second terminal is allowed to generate information related to a new route according to such condition so as to provide to a user, thereby improving efficiency of the use due to the sharing of information between the terminals.

The above described embodiments of a navigation unit may be installed in any type of vehicle, including an automobile, a truck, a bus, a boat, etc.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A navigation apparatus configured to be installed in a vehicle, comprising:
    a display;
    a wireless communication unit; and
    a controller operatively connected to the display and configured to:
        receive a first destination from a mobile terminal for controlling the navigation apparatus,
        display route information from an origination position to the first destination received from the mobile terminal,
        display, on the display of the navigation apparatus, when a current position of the navigation apparatus is within a preset range of the destination, a message inquiring whether or not the first destination is a final destination,
        receive a new destination after an input indicating that the first destination point is not the final destination, and
        display, on the display of the navigation apparatus, road guidance information from the current position to the new destination point.

2. The navigation apparatus of claim 1, wherein the controlled is further configured to transmit new route information to the new destination to the mobile terminal when the navigation terminal is in a preset range of first destination.

3. The navigation apparatus of claim 2, wherein the new route information comprises one of abbreviated map data in a graphic format and data in a turn-by-turn list format.

4. The navigation apparatus of claim 2, wherein the new route information includes information that enables the mobile terminal to
    reproduce video information corresponding to a straight section included in the new route information at a speed faster than a reproduction speed,
    reproduce video information corresponding to a curved section included in the new route information at a speed slower than the reproduction speed, and
    receive the route information while reproducing the video information corresponding to the straight section included in the new route information at the speed faster than the reproduction speed and while reproducing the video information corresponding to the curved section included in the new route information at the speed slower than the reproduction speed.

5. The navigation apparatus of claim 1, wherein the controller is further configured to transmit, by the navigation terminal, new route information to the new destination for controlling the mobile terminal, to the mobile terminal for displaying the road guidance information to the new destination by the mobile terminal.

6. A navigation apparatus configured to be installed in a vehicle, comprising:
    a display;
    a wireless communication unit; and
    a controller operatively connected to the display and configured to:
        cooperate with a mobile terminal by receiving, via the wireless communication unit, a first destination from the mobile terminal for controlling the navigation apparatus,
        display route information from an origination position to the first destination in response to receiving the first destination from the mobile terminal,
        display, on the display of the navigation apparatus, when a current position of the navigation apparatus is within a preset range of the destination, a message inquiring whether or not the first destination is a final destination,
        receive a new destination after an input indicating that the first destination point is not the final destination,
        display, on the display of the navigation apparatus, road guidance information from the current position to the new destination point, and
        transmit, via the wireless communication unit, new route information to the new destination for controlling the mobile terminal, to the mobile terminal for displaying the road guidance information to the new destination by the mobile terminal.

7. A navigation apparatus configured to be installed in a vehicle, comprising:
    a display;
    a wireless communication unit; and
    a controller connected to the display and configured to:
        cooperate with a mobile terminal by receiving, via the wireless communication unit, a first destination from the mobile terminal for controlling the navigation apparatus,
        receive position information in cooperation with associated multiple satellites, calculate a current position of the navigation apparatus according to a triangulation scheme and the position information, match the current position of the navigation apparatus with map information, display route information from the current position to the first destination in response to receiving the first destination from the mobile terminal, display, on the display of the navigation apparatus, when the current position of the navigation apparatus is within a preset range of the destination, a message inquiring whether or not the first destination is a final destination, receive a new destination after an input indicating that the first destination point is not the final destination, generate new route information based on the new destination and the current position, display, on the display of the navigation apparatus, the road guidance information from the current position to the new destination point based on the new route information, and transmit, via the wireless communication unit, the new route information for controlling the mobile terminal, to the mobile terminal for displaying the road guidance information to the new destination by the mobile terminal, wherein the new route information transmitted to the mobile terminal includes abbreviated map data in a graphic format and data in a turn-by-turn list format.

8. A mobile terminal configured to communicate with a vehicle terminal installed in a vehicle, comprising:

a display;

a wireless communication unit; and a controller operatively connected to the display and configured to:

receive a destination, send the received destination to the vehicle terminal via the wireless communication unit, such that first route information from a current position of the vehicle to the destination is displayed on a display of the vehicle terminal, display, on the display of the mobile terminal, a message inquiring whether or not the destination is a final destination based on an event information of the vehicle, and display, on the display of the mobile terminal, second route information from a current position of the mobile terminal to the destination when an input indicating that the destination is the final destination is received, wherein the event information of the vehicle is power information received from the vehicle, and the second route information includes route data in one of an image format, abbreviated data format, a turn-by-turn list format, or a text format.

9. The mobile terminal of claim 8, wherein the controller receives the input indicating that the destination is the final destination.

10. The mobile terminal of claim 8, wherein the controller receives an input indicating that the destination is not the final destination.

11. The mobile terminal of claim 8, wherein the controller does not display, on the display of the mobile terminal, the second route information when an input indicating that the destination is not the final destination is received.

12. The mobile terminal of claim 8, wherein the controller displays, on the display of the mobile terminal, new route information from the current position of the mobile terminal to a new destination when an input indicating that the destination is not the final destination is received.

13. The mobile terminal of claim 8, wherein the controller activates a navigation function of the mobile terminal for displaying the second route information based on the event information of the vehicle.

14. A vehicle terminal installed in a vehicle and configured to communicate with a mobile terminal, comprising:

a display;

a wireless communication unit; and a controller operatively connected to the display and configured to:

receive a destination from the mobile terminal via the wireless communication unit, display, on the display of the vehicle terminal, first route information from a current position of the vehicle to the received destination, send the received destination to the mobile terminal via the wireless communication unit based on an event information of the vehicle, wherein the event information of the vehicle is power information received from the vehicle, and wirelessly transmit second route information from a current position of the vehicle to the destination to the mobile terminal based on an event information of the vehicle, the second route information includes route data in one of an image format, abbreviated data format, a turn-by-turn list format, or a text format.

15. The mobile terminal of claim 14, wherein the controller further configured to determine a distance between the current position of the vehicle and the received destination.

16. A navigation method performed by a mobile terminal configured to communicate with a vehicle terminal installed in a vehicle, the navigation method comprising:

receiving a destination according to an input;

sending the received destination to the vehicle terminal via a wireless communication network, such that first route information from a current position of the vehicle to the destination is displayed on a display of the vehicle terminal;

displaying, on the display of the mobile terminal, a message inquiring whether or not the destination is a final destination, based on an event information of the vehicle; and displaying, on the display of the mobile terminal, second route information from a current position of the mobile terminal to the destination when an input indicating that the destination is the final destination is received, wherein the event information of the vehicle is power information received from the vehicle, and the second route information includes route data in one of an image format, abbreviated data format, a turn-by-turn list format, or a text format.

17. The navigation method of claim 16, further comprising:

receiving the input indicating that the destination is the final destination or receiving an input indicating that the destination is not the final destination.

18. The navigation method of claim 16, further comprising:

a step which does not display, on the display of the mobile terminal, the second route information when an input indicating that the destination is not the final destination is received.

19. The navigation method of claim 16, further comprising:

displaying, on the display of the mobile terminal, new route information from the current position of the mobile terminal to a new destination when an input indicating that the destination is not the final destination is received.

20. The navigation method of claim 16, wherein the displaying the second route information includes activating a navigation function of the mobile terminal for displaying the second route information based on the event information of the vehicle.

21. A navigation method performed by a vehicle terminal configured to be installed in a vehicle, the navigation method comprising:

receiving a destination from a mobile terminal via a wireless communication network;

displaying, on the display of the vehicle terminal, first route information from a current position of the vehicle to the received destination;

sending the received destination to the mobile terminal via the wireless communication network based on an event information of the vehicle, wherein the event information of the vehicle is power information received from the vehicle; and wirelessly transmitting second route information from a current position of the vehicle to the destination to the mobile terminal based on an event information of the vehicle, the second route information includes route data in one of an image format, abbreviated data format, a turn-by-turn list format, or a text format.

22. The navigation method of claim 21, further comprising:

determining a distance between the current position of the vehicle and the received destination.

* * * * *